United States Patent Office 2,737,028
Patented Mar. 6, 1956

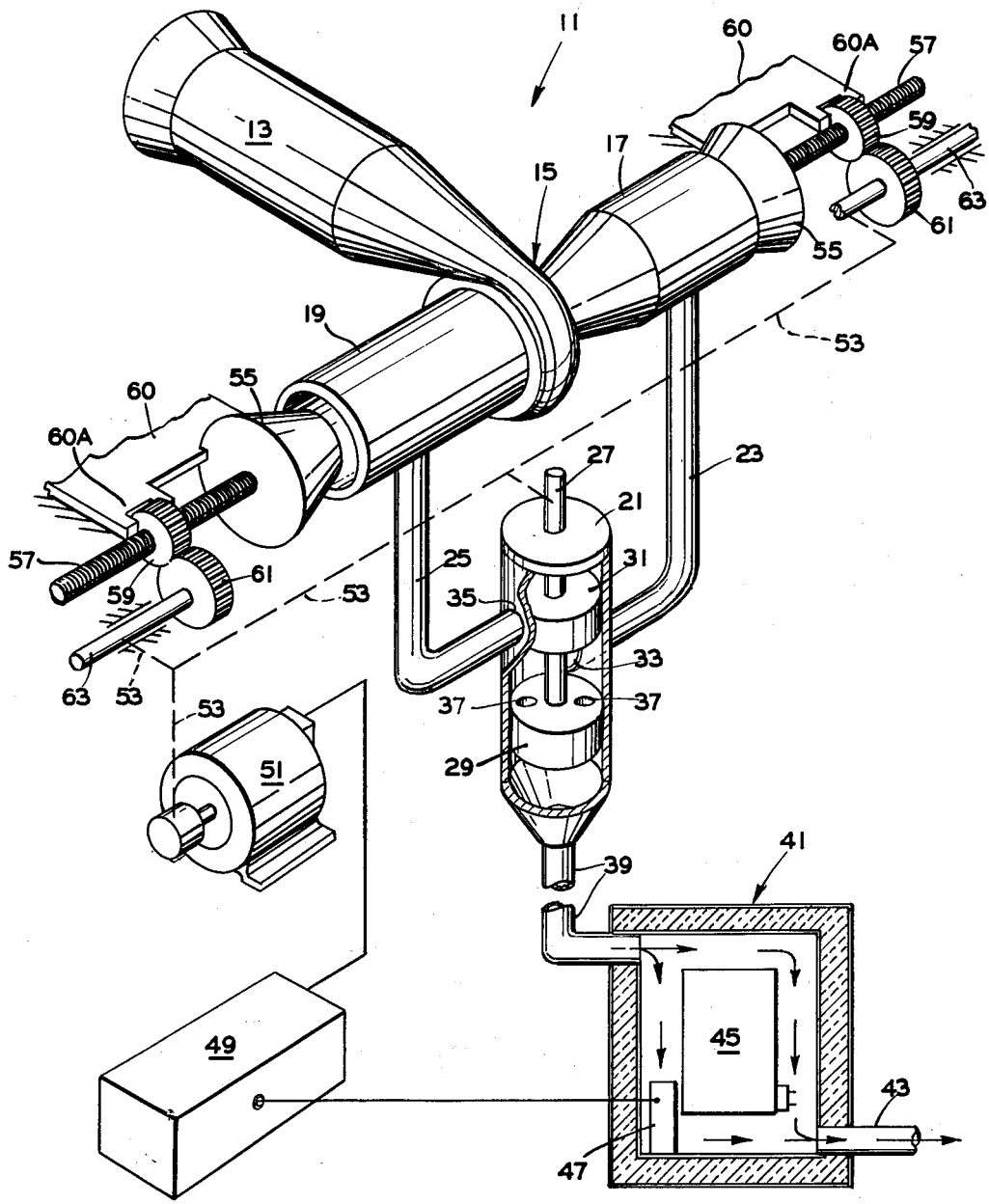

2,737,028

TEMPERATURE CONTROL SYSTEM

Sigmund Machlanski, Monrovia, Calif., assignor to Bendix Aviation Corporation, Teterboro, N. J., a corporation of Delaware Application December 31, 1952, Serial No. 329,049

12 Claims. (Cl. 62—6)

This invention relates to a control system and more particularly to a system for regulating the temperature within an enclosure and/or of objects therein, subject to wide variations in temperature.

In high speed aircraft, the temperatures encountered vary widely so that the problems of adequately conditioning the parts or sections of the craft are not readily solved. For example, the free air surrounding the craft may vary with the different altitudes between a minimum of −65° F. to a maximum of 200° F., while at high speeds approaching the sonic region, the aerodynamic heating caused by skin friction may reach temperatures in excess of 600° F. Under such conditions, maintenance of a fixed temperature, or a limited range of temperatures, becomes necessary in the interest of strength and performance considerations of structural parts or equipment, and for human comfort.

An object of the present invention, therefore, is to provide a novel control system for regulating the temperature within an enclosure and/or of an object therein.

Another object is to provide a novel temperature control for high speed aircraft where the temperature within the craft, or of parts thereof, is subject to extreme changes.

A further object is to provide a novel control system which utilizes a fluid medium flowing at a high velocity and automatically maintains the temperature of an object at a desired value.

Still another object is to provide a novel control system which employs means for dividing a fluid stream flowing at a high velocity into two streams, one being at a higher temperature than the other, and utilizes the streams to maintain the temperature within an enclosure and/or of an object therein, at a desired value.

The present invention, therefore, contemplates a novel system for controlling the temperature within an enclosure, or of an object therein subject to variations in temperature. The system embodies a centrifugal type separator which divides a stream of high velocity fluid into two streams, one stream being at relatively high temperatures and the other at relatively low temperatures. Duct means connect the separator with an enclosure to provide the latter with the fluid streams. A temperature responsive device senses the temperature within the enclosure and controls the operation of a valve controlling the supply of both streams to the enclosure.

The above and other objects and advantages of the present invention will appear more fully hereinafter from a consideration of the detailed description which follows taken together with the accompanying schematic drawing wherein the single figure of the drawing illustrates one embodiment of the invention.

For purposes of explanation, the present invention is disclosed as directed to a temperature control system for aircraft, but it must be understood that the invention is applicable to any arrangement, the object of which is to automatically regulate the temperature within an enclosure or of an object located within the enclosure.

For a better understanding of the invention, reference is now had to the single figure of the drawing wherein a temperature control system, generally designated by the numeral 11, comprises an air scoop 13. The air scoop may be a ram opening located in the leading edge of an airplane wing (not shown) to utilize the ram air from the forward velocity of the craft in flight. Connected to air scoop 13 is a centrifugal type separator or vortex tube 15 which separates the air stream entering the air scoop into two portions or air streams, one of which is at high temperatures while the other is at low temperatures. As is well known to those skilled in the art, a vortex tube has the characteristic of whirling the air about an axis and the effect of such action produces an essentially adiabatic pressure and temperature profile between the center, or axis, of the whirling air column, and the outer periphery. The temperature and pressure conditions at the center will approach that of the free air surrounding the aircraft while the conditions at the periphery will approach the total pressure and total temperature resulting from the speed of the craft. Since vortex tubes are well known in the art, further amplification of the operation of such tubes is believed unnecessary.

A duct 17 is connected to the center of vortex tube 15 to receive the stream therefrom, while a duct 19 is connected to receive the stream from the periphery of the tube, whereby the hot air stream enters the latter duct while the cold air stream enters duct 17. Communicating ducts 17 and 19, respectively, with a duct 21 are a pair of conduits 23 and 25. A control valve 27 is slidably disposed in duct 21 and has a pair of disks 29 and 31 cooperating with a pair of inlet ports 33 and 35 connected to conduits 23 and 25, respectively. Valve 27 is operable in opposite directions and disks 29 and 31 are in close fitting engagement with the wall of duct 21, so that when a disk covers its associated inlet port, the air from the associated conduit is prevented from entering the duct. Thus, valve 27, in the position shown in the drawing, permits cold air to enter duct 21 while the hot air is prevented from entering. If valve 27 is moved in an upward direction to entirely uncover inlet port 35 and cover port 33, then only the hot air stream enters duct 21. Valve 27 also may be displaced to a position wherein a part of each inlet port is uncovered to permit portions of each air stream to enter the duct.

A plurality of passageways 37 (two are shown in the drawing) are formed in disk 29 to provide passage of air from one side of the disk to the other side. Duct 21 is connected to a conduit 39 which communicates with an inlet opening formed in a jacket of heat insulating material defining an enclosure 41. The jacket has a bleed 43 to a static port to provide means for allowing air to leak from the enclosure. An instrument 45 is suitably mounted within the jacket, by means not shown, and is subjected to the air entering the enclosure from conduit 39. Instrument 45 may be a transmitting element of a remote indicating system, or control system, arranged to provide signals corresponding to a condition being considered, and the instrument may be connected to transmit such signals to a receiver located at a remote point.

Disposed within enclosure 41 is a temperature pick-up or temperature responsive device 47 which senses the temperature of the air within the enclosure. Device 47 is a conventional type of temperature responsive means which is set for a temperature of a desired value, or for a range of temperatures, so that when the temperature of the air within the enclosure falls below the desired value, a signal of one phase or polarity will be developed, while a signal of opposite phase or polarity will be generated when the temperature rises above the desired value. It is to be understood that any suitable temperature responsive device may be employed within the scope of the present invention, as long as the device provides means which sense temperatures above and below a desired value, to furnish intelligible signals corresponding to such temperatures.

The signals generated by device 47 are fed to a conventional amplifier 49, shown as a box, which has its output connected to a conventional two phase motor 51. Motor 51 has a variable phase winding (not shown) which is excited by the output of amplifier 49 and the motor is driven in one direction or the other at a rate depending upon the magnitude and phase of the signal. A driving connection, shown as a broken line 53, transmits motion of motor 51 to valve 27 to longitudinally displace the latter within conduit 21. If the temperature of the air within enclosure 41 is lower than the desired value, device 47 generates a command signal which drives motor 51 in a direction to displace valve 27 so as to uncover inlet port 35 and cover port 33, allowing a flow of hot air only into the enclosure. Conversely, if the temperature of the air within the enclosure is higher than desired, a command signal of opposite phase drives motor 51 in an opposite direction so as to effect displacement of valve 27 to uncover port 33 and cover port 35, allowing cold air only to flow into the enclosure, and, as brought out hereinbefore, the valve may be displaced to a position wherein portions of both air streams flow into duct 21 when conditions warrant it.

Ducts 17 and 19 each have a frusto-conical bleed valve 55 which may be moved to a position wherein the air stream, or portions thereof in the respective ducts, may be discharged therefrom. The bleed valves 55 fit into discharge ports of ducts 17 and 19 and each has fixedly connected thereto a threaded shaft 57. Gear members 59, having internally threaded bores engaging the threads of shafts 57, are disposed on each of the shafts and are in mesh with gears 61 fixedly supported on rotatable shafts 63. Motion of motor 51 is transmitted to each shaft 63 by way of driving connection 53 to provide rotation of gears 61. A pair of plate members 60 have bifurcated parts 60A which restrain gears 59 from moving axially but permit rotation thereof. A slot is cut in each bleed valve 55 and accommodates a portion of plate member 60, whereby the valves are displaced axially with rotation of gears 59, but restrained from rotating.

Considering the operation of the arrangement described above, let it be assumed that the temperature of the air within enclosure 41 is such that temperature responsive device 47 calls for hot air. A signal of proper phase will be developed by device 47 to drive motor 51 in a direction to effect movement of valve 27 to permit hot air to enter duct 21. Simultaneously, driving connection 53 effects motion of gear shafts 63 and gears 59 and 61 to move bleed valves 55 to cover the discharge port of duct 19 and uncover the discharge port of duct 17. As a result, the cold air from vortex tube 15 is discharged from the duct system while the hot air from the vortex tube flows into duct 21. And conversely, if cold air is required in enclosure 41, bleed valves 55 will operate to cover the discharge port of duct 17 while the discharge port of duct 19 is uncovered, and valve 27 will be operated to exclude hot air and admit cold air to duct 27.

In this manner the portion of the air stream that is not required for conditioning the instrument 45 is discharged from the duct system. When enclosure 41 requires the combination of a portion of each air stream, bleed valves 55 are moved to intermediate positions to uncover part of each discharge port of ducts 17 and 19, and valve 27 is shifted to admit both cold and hot air to duct 17.

The invention is described herein for regulating the temperature of an instrument, but it is apparent that the temperature control system hereof may be employed to regulate the temperature within compartments of the craft, and of parts and equipment thereof. Other uses of the invention are apparent, such as test arrangements wherein it is desired to subject an object to a wide range of temperatures. In such cases, a source of compressed air may be provided for the vortex tube to obtain air streams at different temperatures. Instead of providing a device which responds to the temperature of the air within an enclosure, the device may be arranged to respond to the temperature of the object itself.

It will now be apparent that the present invention provides a novel and an effective temperature control system for automatically regulating the temperature within an enclosure, or of an object.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. Means for regulating the temperature within an enclosure comprising a ram inlet providing a source of ram air, means communicating with said ram inlet and separating said ram air into two streams having different temperatures, duct means for supplying said enclosure with both said streams, valve means carried by said duct means for controlling the supply of both streams to said enclosure, and means responsive to the temperature within said enclosure for controlling operation of said valve means.

2. A temperature regulated air supply system for an enclosure, comprising means for supplying from a source outside of the enclosure two streams of air having different temperatures, means connecting said supply means with the enclosure, valve means carried by the air supply, means for supplying controlled portions of both streams simultaneously to said enclosure, second valve means carried by said supply means for discharging from the latter the portion of each air stream not supplied to said enclosure, and means responsive to the temperature within said enclosure for controlling the operation of both valve means.

3. A temperature regulated air supply system for an enclosure in high speed aircraft, comprising a source of ram air, means for separating said ram air into two air streams having different temperatures, means connecting the separating means with said enclosure for supplying air from both streams simultaneously to the enclosure, valve means carried by said supply means for controlling the proportionate supply of said air streams to said enclosure, second valve means carried by said supply means for separately discharging the portion of each air stream not supplied to said enclosure, and actuating means for operating both of said valve means including temperature responsive means within said enclosure.

4. A temperature regulated air supply system for an enclosure in a high speed aircraft, comprising a source of ram air, means for heating a portion of the air from the source, means for thereafter separating the heated portion from the unheated portion of said air, and means for supplying an adjusted mixture of said heated and unheated air portion from the source of the enclosure under ram pressure.

5. A temperature regulated air supply system for an enclosure in a high speed aircraft, comprising a source of ram air, a vortex tube having an inlet connected to said source and separate outlets for heated and unheated air, means for supplying air from both outlets simultaneously under ram pressure to the enclosure, and means responsive to the temperature in the enclosure for varying the proportion of air supplied from each outlet.

6. A temperature regulated air supply system for an enclosure in a high speed aircraft, comprising a source of ram air, a vortex tube having an inlet connected to said source and separate outlets for heated and unheated air, an air supply duct connected to the enclosure, passages connecting said outlets to the duct and means responsive to the temperature in the enclosure for varying the proportion of air supplied from each passage under ram pressure to the duct.

7. A temperature controlled air supply system, comprising means for supplying two streams of air at different temperatures, means for combining varying proportions of said streams to provide a variable temperature air supply, and means for separately discharging the remainder of each stream.

8. A temperature controlled air supply system, comprising means for supplying two streams of air at different temperatures, means for combining portions of said streams to provide a variable temperature air supply, means for separately discharging the remaining portions of said streams, and unitary means for varying the proportions of the air stream portions that are combined, and correspondingly varying the proportions of the portions of the air streams that are discharged.

9. A temperature controlled air supply system for an enclosure comprising means for supplying two streams of air at different temperatures, means for combining, and supplying to the enclosure, portions of said stream to provide a variable temperature air supply to the enclosure, means for separately discharging the remaining portions of said streams, and means responsive to the temperature in the enclosure for varying the proportions of the air streams that are combined, and correspondingly varying the proportions of the air streams that are discharged.

10. A temperature regulated air supply system for an enclosure, comprising a source of air under pressure, means for dividing air from the source into two streams and heating one stream, means for combining variable portions of the streams to provide a temperature regulated air supply for the enclosure, means for separately discharging the remaining variable portions of said streams, and means responsive to temperature in the enclosure for controlling the combining means and the discharge means.

11. A temperature regulated air supply system, comprising a source of air under pressure, a vortex tube having an inlet connected to the source, an axial heated air compartment at one side of the tube, an axial cold air compartment at the other side of the tube, air supply passages from said compartments, valve means for varying the flow of air through said passages, discharge outlets from said compartments, second valve means for varying the discharge of air through said outlets, and common control means for both of said valve means.

12. A temperature regulated air supply system for an enclosure, comprising a source of air under pressure, a vortex tube having an inlet connected to said source, an axial unheated air compartment at one side of the tube, an axial heated air compartment at the other side of the tube, discharge outlets at opposite ends of said compartments, an air discharge outlet in each compartment, ganged valve means varying in opposite senses the discharge of air from said outlets, a separate air supply passage connected to each compartment, a common feed duct connecting the passages and the enclosure, valve means varying in opposite senses the supply of air from the passages to the duct, and means responsive to the temperature in the enclosure for controlling both valve means.

References Cited in the file of this patent

UNITED STATES PATENTS

| | | |
|---|---|---|
| 1,942,295 | Kerr | Jan. 2, 1934 |
| 1,952,281 | Ranque | Mar. 27, 1934 |
| 2,130,089 | Hull | Sept. 13, 1938 |
| 2,254,185 | Newton | Aug. 26, 1941 |
| 2,398,655 | Mayer | Apr. 16, 1946 |
| 2,412,110 | Williams | Dec. 3, 1946 |
| 2,451,280 | Del Mar | Oct. 12, 1948 |
| 2,495,861 | Newton | Jan. 31, 1950 |
| 2,669,101 | Shields | Feb. 16, 1954 |